United States Patent [19]

De La Salle et al.

[11] Patent Number: 5,402,348
[45] Date of Patent: Mar. 28, 1995

[54] METHOD AND APPARATUS FOR DETERMINING THE POSITION OF AN OBJECT WITHIN LANES DETERMINED UTILIZING TWO INDEPENDENT TECHNIQUES

[75] Inventors: Paul G. De La Salle; Nigel J. Cousins, both of Swindon, England

[73] Assignee: Securicor Datatrak Limited, Swindon, England

[21] Appl. No.: 921,656

[22] Filed: Jul. 30, 1992

[30] Foreign Application Priority Data

Aug. 2, 1991 [GB] United Kingdom ............... 91167718

[51] Int. Cl.⁶ .............................. G01S 5/06; G01S 1/08
[52] U.S. Cl. ........................................ 364/460; 364/452; 340/988; 342/386; 342/450
[58] Field of Search .............. 364/443, 449, 460, 452; 340/988, 989; 342/450, 451, 452, 454, 457, 463, 464, 385, 386, 387, 388, 393, 394

[56] References Cited

U.S. PATENT DOCUMENTS

| | | | |
|---|---|---|---|
| 3,623,100 | 11/1971 | Rapp | 342/387 |
| 3,848,254 | 11/1974 | Drebinger et al. | 342/457 |
| 4,054,880 | 10/1977 | Dalabakis et al. | 342/464 |
| 4,232,317 | 11/1980 | Freeny, Jr. | 342/464 |
| 4,398,198 | 8/1983 | Dano et al. | 342/451 X |
| 4,442,432 | 4/1984 | Quigley | 342/450 X |
| 4,492,963 | 1/1985 | Scarlet et al. | 364/452 X |
| 4,713,768 | 12/1987 | Kosaka et al. | 364/460 |
| 4,916,455 | 4/1990 | Bent et al. | 342/457 |
| 4,987,420 | 1/1991 | Inamiya | 342/457 |
| 5,163,004 | 11/1992 | Rentz | 364/460 |
| 5,173,710 | 12/1992 | Kelley | 342/463 |

*Primary Examiner*—Kevin J. Teska
*Assistant Examiner*—Collin W. Park
*Attorney, Agent, or Firm*—Lowe, Price, LeBlanc & Becker

[57] ABSTRACT

A method of determining the position of an object comprising the steps of: producing a plurality of hyperbolic electromagnetic wave patterns; calculating from said patterns at least three lines of position; identifying the lane of each line of position by two independent methods; comparing the size of the area enclosed by the lines of position based on the lanes identified by a first of said methods with the size of the area enclosed by the lines of position identified by a second of said methods and producing therefrom an indication as to whether the lanes identified by the first method are more likely to be correct than those identified by the second method; and computing the position of the object using the lines of position based on the lanes identified as being more likely to be correct.

9 Claims, 2 Drawing Sheets

METHOD AND APPARATUS FOR DETERMINING THE POSITION OF AN OBJECT WITHIN LANES DETERMINED UTILIZING TWO INDEPENDENT TECHNIQUES

BACKGROUND OF THE INVENTION

This invention relates to methods of determining the position of objects and in particular, although not so restricted, to methods of locating vehicles.

In recent years there has been a growing awareness of the possible benefits of using electronic navigation systems to position and track vehicles within an established highway infrastructure. Up until now navigation systems were designed primarily for use by ships and aircraft which, because of their ability to move unconstrained in any direction through featureless surroundings, relied solely upon information from a navigation system to determine their position accurately. The navigation systems used at sea and in aircraft, however, were unsuitable for use on land: they were too large to install conveniently in a land vehicle; and they were to expensive. However recent developments in navigation techniques, and in electronic data processing have reached a point where it is now possible to provide a vehicle location system at reasonable cost and suitable for installation in ordinary road going vehicles.

A vehicle location system may be employed to guide the driver of a vehicle to an intended destination or so that an operator can establish the location of one or more vehicles in a fleet of such vehicles. Regardless of the intended application of a vehicle location system, namely vehicle guidance or fleet control, the most important requirement of the system is the establishment of the position of the vehicle within acceptable limits of accuracy.

The present invention seeks to provide a vehicle location system which provides an indication of the position of a vehicle with a relatively high degree of accuracy.

SUMMARY OF THE INVENTION

Although the present invention is primarily directed to any novel integer or step, or combination of integers or steps, herein disclosed and/or as shown in the accompanying drawings, nevertheless, according to one particular aspect of the present invention to which, however, the invention is in no way restricted, there is provided a method of determining the position of an object comprising the steps of: producing a plurality of hyperbolic electromagnetic wave patterns; calculating from said patterns at least three lines of position; identifying the lane of each line of position by two independent methods; comparing the size of the area enclosed by the lines of position based on the lanes identified by a first of said methods with the size of the area enclosed by the lines of position identified by a second of said methods and producing therefrom an indication as to whether the lanes identified by the first method are more likely to be correct than those identified by the second method; and computing the position of the object using the lines of position based on the lanes identified as being more likely to be correct.

The position of the object may be computed using a least mean squares technique.

In one embodiment, the areas bounded by the lines of position determined by the two said methods are compared.

In another embodiment, the sum of the lengths of perpendiculars from the computed position to the lines of position determined by the two said methods are compared.

In a further embodiment, the sum of the lengths of lines from the computed position to the apexes of the areas enclosed by the lines of position determined by the two said methods are compared.

The method may include the step of producing the lines of position in cartesian co-ordinates.

BRIEF DESCRIPTION OF THE DRAWINGS

The invention is illustrated, merely by way of example, in the accompanying drawings, in which.

DESCRIPTION OF PREFERRED EMBODIMENT

Figure 1:
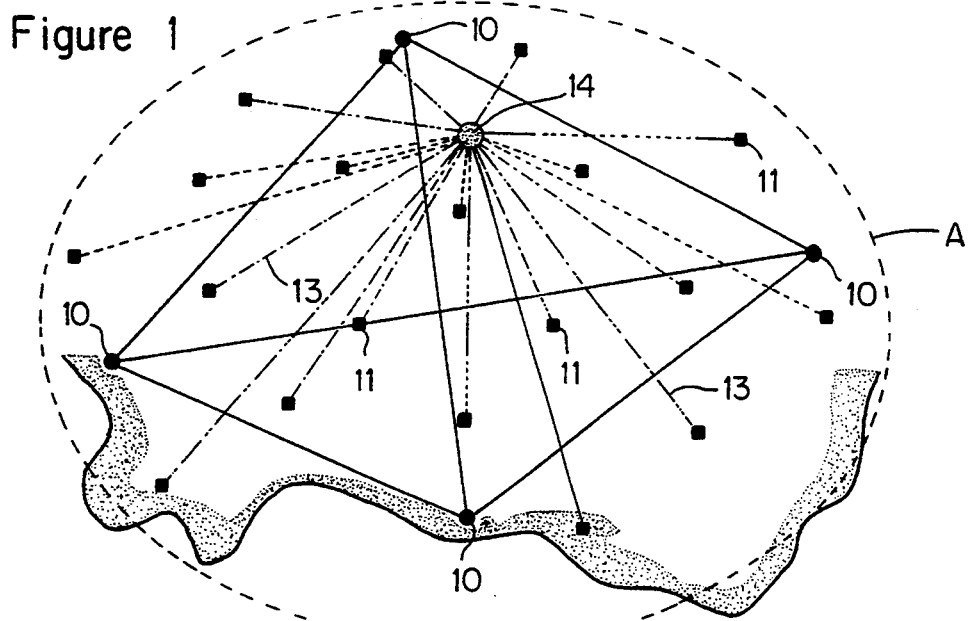
FIG. 1 is a schematic view of a vehicle location system according to the present invention.

Referring first to FIG. 1 there is illustrated a vehicle location system according to the present invention. A plurality of time synchronised fixed transmitters 10 which transmit low frequency signals, for example, between 130 kHz and 150 kHz on a time shared basis. Within an area A covered by the transmitters 10 there are a plurality of fixed base stations 11. The base stations receive data from vehicles within the area A and send this data, for example, by telephone lines 13 to a data collection centre 14. At the data collection centre the data received from the base stations is processed to provide an indication of the location of each vehicle in the area A. As shown in FIG. 1 there are four transmitters 10 and nineteen base stations 11.

In each vehicle there is a locator unit to be described in greater detail hereinafter. Essentially the locator unit measures the phase difference between the signals it receives from each transmitter within range and uses this information to generate hyperbolic lines of position. By receiving signals from at least three transmitters the position of the vehicle can be established.

Figure 2:
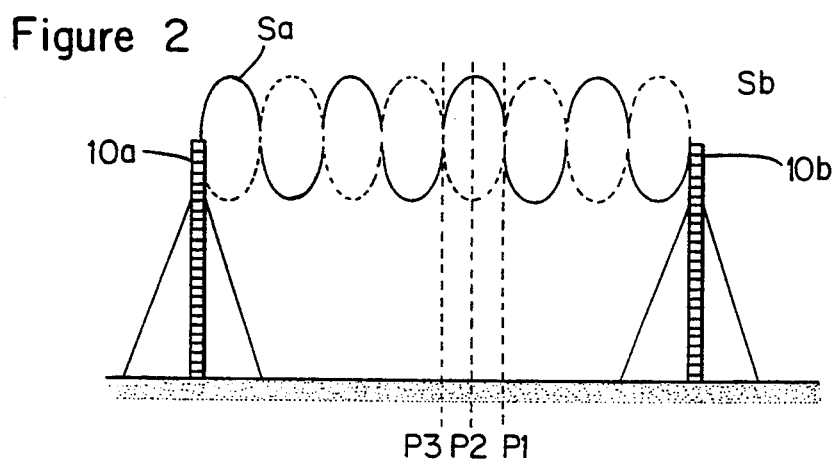
FIG. 2 illustrates the signals produced by two transmitters forming part of the vehicle location system of FIG. 1.

FIG. 2 shows two transmitters 10a, 10b which radiate continuous wave sinusoidal signals Sa, Sb, respectively. The waveforms of the signals shown in FIG. 2 are for an instant in time and are, therefore frozen. The frequency of the signal Sa produced by the transmitter 10a is kept accurately constant, whilst the transmitter 10b incorporates a receiver (not shown) which is tuned to the signal Sa to enable the transmitter 10b to transmit the signal Sb phase locked to the signal Sa. Assuming that the transmitters 10a, 10b are separated by an even number of whole wavelengths and since the two transmitters are synchronised, a locator unit situated halfway between the two transmitters at point P1 will receive the two signals Sa, Sb from the transmitters in phase since the distance travelled by each signal will be identical. If, however, the locator unit moves towards one of the transmitters and away from the other, the two signals Sa, Sb will no longer be in phase. In FIG. 2 point P2 is a position where the two signals Sa, Sb are separated by exactly 180°, that is to say the signals are completely out of phase. Point P3 is a position where the two signals Sa, Sb are again in phase. In moving from P1 to P3 the locator unit is said to have crossed one "lane", the width of which is equal to half the wavelength of the frequency of the signals from the transmitters 10a, 10b.

Figure 3:
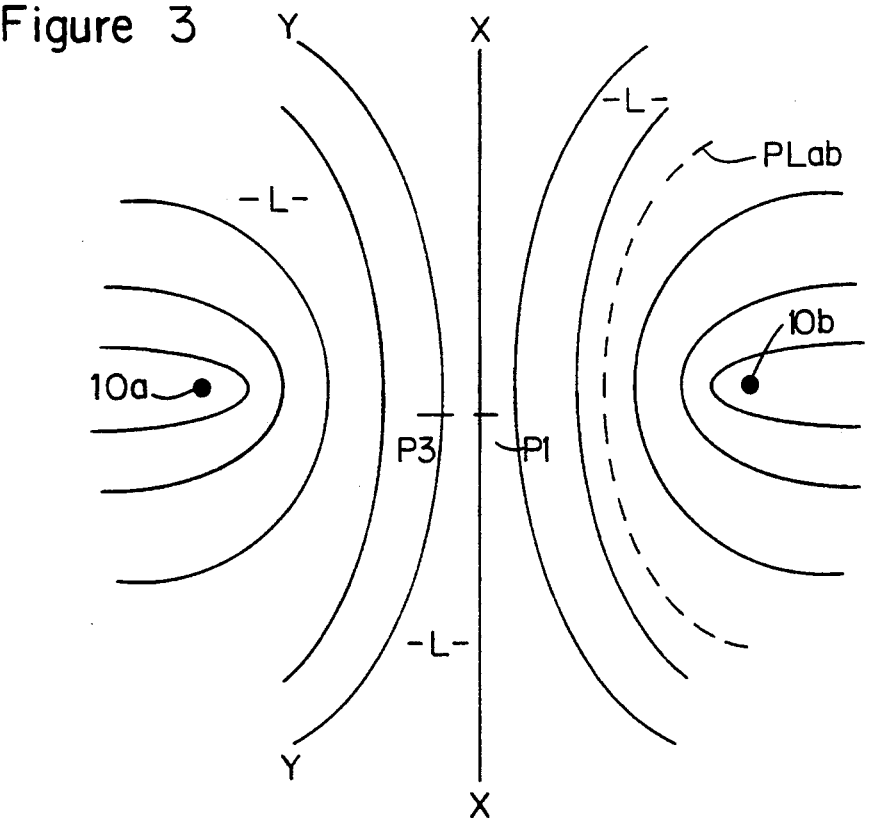
FIG. 3 shows hyperbolic lines of zero phase difference between the transmitters of FIG. 2.

FIG. 3 shows hyperbolic lines of zero phase difference between the transmitters 10a, 10b. The area L separating adjacent hyperbolic lines is a lane. It will be appreciated that a locator unit at point P1 will produce the same indication of lane (hereinafter referred to as "lane reading") at any point on the hyperbolic line X—X that passes through point P1. Similarly the locator unit at point P3 will produce the same lane reading at any point along the hyperbolic line Y—Y. A family of hyperbolic lines, such as shown in FIG. 3, is referred to as a "hyperbolic pattern" and can be generated between any two transmitters. As a locator moves through the hyperbolic pattern it measures the difference in phase between the signals Sa, Sb received from the transmitters. If the measured phase difference is zero then the locator unit must be on one of the hyperbolic lines. As the locator unit moves through a single lane L the phase difference changes from 0° to 360°. Thus measurement of the phase difference determines a hyperbolic position line PLab of the locator unit in a lane, but no indication of the position of the lane itself relative to the transmitters 10a, 10b.

Figure 4:
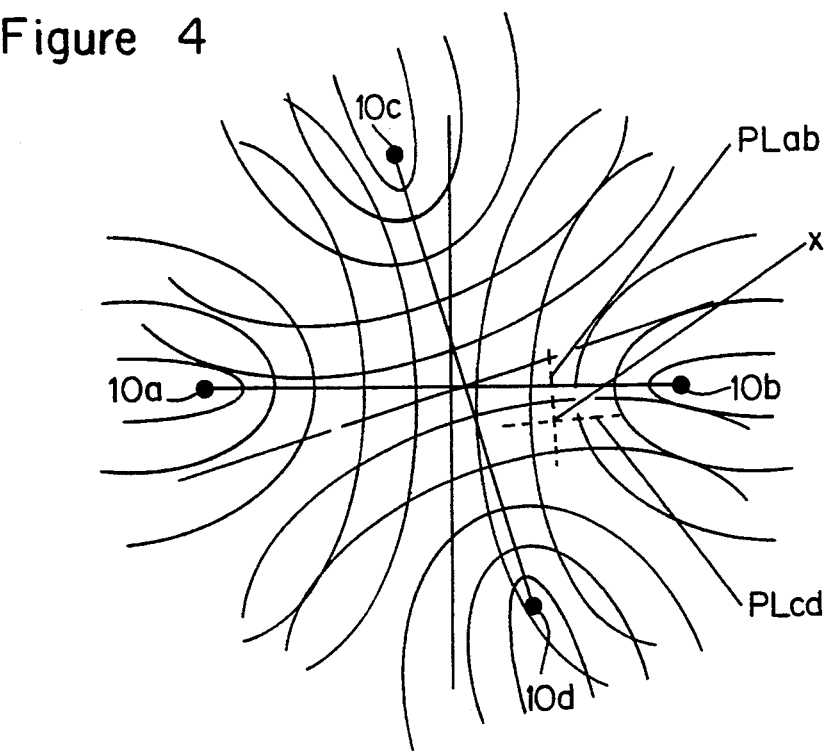
FIG. 4 shows hyperbolic lines of zero phase difference between four transmitters positioned as shown in FIG. 1.

As shown in FIG. 4, by utilising the signals transmitted from a second pair of transmitters 10c, 10d, a second hyperbolic pattern is produced giving a hyperbolic position line PLcd. Thus the position X of the locator unit can be determined from the intersection of hyperbolic position lines PLab, PLcd determined from the two hyperbolic patterns.

The principle of phase comparison is inherently ambiguous since the phase measurement only determines the position of the locator unit within a single lane. Thus the locator unit must also identify the lane in which the locator unit is positioned.

In the present invention two methods of lane identification are employed. In a first method the locator unit is initialised at a known position and then counts lanes as it moves through them from the known position. This maintains a check on the lane in which the locator unit is currently situated. In a second method of lane identification two coarse hyperbolic patterns are superimposed on the fine hyperbolic patterns shown in FIG. 4. The coarse hyperbolic patterns are generated at a different frequency from the fine hyperbolic patterns and have lanes which are wider than those shown in FIG. 4.

In this second method of lane identification the frequency of the coarse hyperbolic pattern may, for example, be a tenth the frequency of the fine hyperbolic pattern. That is to say the width of each lane generated by the coarse hyperbolic pattern will contain ten lanes of the fine hyperbolic pattern. The locator unit measures the phase of the coarse hyperbolic pattern and by scaling up by a factor calculated from the relative frequencies used to generate the coarse and fine hyperbolic patterns (10 in this example) produces the second lane identification. Because of small errors in the phase measurement of the coarse hyperbolic pattern, when scaled up, there may be a discrepancy between the lane identifications produced by the two methods. Discrepancies may also be caused by perturbations in the propagated waves due to noise, reflections from the ionosphere, variations in signal propagation speed with terrain, etc.

The aim of this invention is to determine which of the lane indentification produced by the two lane identifications methods is the more likely to be the correct one. As will be appreciated an incorrect lane identification may lead to a serious error in determining the position of the locator unit.

Figure 5:
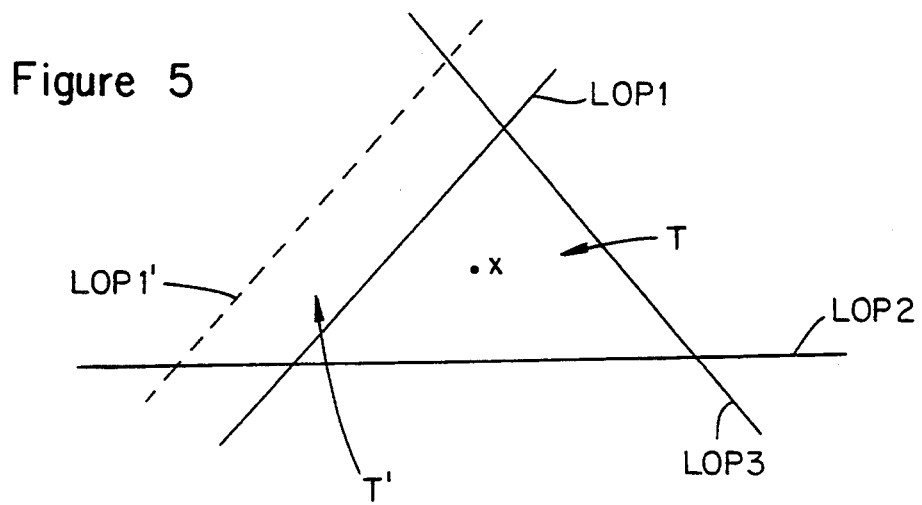
FIG. 5 is a diagram illustrating a method according to the present invention of determining the position of a vehicle.

FIG. 5 illustrates a method according to the present invention seeking to determine which of the lane identifications determined from the two lane identification methods is the more likely to be correct.

To this end there are three pairs of transmitters to produce three hyperbolic position lines. The locator unit converts the hyperbolic position lines into cartesian co-ordinates, for example those of the National Grid, and from this three lines of position LOP1, LOP2, LOP3 are generated using the lane identification determined by the first lane identification method. These three lines of position should theoretically intersect at a single point, that being the position of the locator unit. However, in practice, the three lines of position enclose a triangle T. Thus an estimate of the position X of the locator unit within this triangle is calculated using, for example, the conventional least mean squares technique. In addition the locator unit calculates the size of the triangle T enclosed by the three lines of position.

If the second lane identification method gives a different lane identification for one of the lines of position LOP1, LOP2, LOP3 for that given by the first lane identification method a new line of position is calculated using the lane identification determined by the second lane identification method.

FIG. 5 shows the case where from the second lane identification method a line of position LOP1', parallel to the line of position LOP1 is calculated. The locator unit determines the size of the triangle T' enclosed by the lines of position LOP1', LOP2, LOP3.

As shown in FIG. 5 the size of the triangle T determined by the lines of position LOP1, LOP2, LOP3 is smaller than that of the triangle T' determined by the lines of position LOP1', LOP2, LOP3. Thus the locator unit determines that the lane identification determined by the second lane identification method is likely to be incorrect and, in consequence the line of position LOP1 is more likely to correct than the line of position LOP1'. It will, of course, be appreciated that if the size of the triangle T' determined by the lines of position LOP1', LOP2, LOP3 is smaller than that determined by the lines of position LOP1, LOP2, LOP3 then it is more likely that the lane identification determined from the second lane identification method is more likely to be correct and, in consequence, the line of position LOP1' is more likely to be correct than the line of position LOP1. If this is the case the locator unit uses the triangle T' determined by the lines of position LOP1', LOP2, LOP3 to determine the position of the locator unit using, for example, the least mean squares technique.

In the above discussion reference has been made to calculation of the "size" of the triangle defined by three lines of position. The calculation may be done in a number of ways. One is to determine the area of the triangle; another is to determine the sum of the lengths of perpendiculars from the computed position X of the locator unit within the triangle to each of the lines of position; and a third is to determine the sum of the lengths of lines from the computed position X of the locator unit within the triangle to each apex of the triangle.

If using the first and second lane identification methods the lane identification for two or more of the lines of position does not coincide, the size of the triangle T enclosed by the lines of position determined from the first lane identification method and the lines of position determined from the second lane identification method are compared. The position of the locator unit is then determined from the lines of position that enclose the triangle of the smaller area.

It will be appreciated that in the method according to the present invention there must be at least three lines of position. However, for greater accuracy, more than three lines of position will be used in practice. The size of the areas enclosed by these lines of position then being a measure of whether the determination of lane identification by the first lane identification method or the second lane identification method is the more likely to be correct.

What we claim is:

1. A method of determining a position of an object comprising the steps of:
   (a) producing a plurality of hyperbolic electromagnetic wave patterns;
   (b) calculating from said patterns at least three lines of position each of which is defined by a lane;
   (c) identifying a lane of each of said lines of position by two independent techniques;
   (d) comparing a size of a first area enclosed by lines of position based on the lanes identified by a first of said techniques with a size of a second area enclosed by lines of position based on the lanes identified by a second of said techniques and producing therefrom an indication as to whether the lanes identified by the first technique are more likely to be correct than those identified by the second method; and
   (e) computing the position of the object using the lines of position based on the lanes identified as being more likely to be correct.

2. A method as claimed in claim 1, in which the position of said object is computed using a least mean squares technique.

3. A method as claimed in claim 1, in which areas bounded by the lines of position determined by said two techniques are compared.

4. A method as claimed in claim 1, in which a sum of the lengths of perpendiculars from the computed position to the lines of position determined by said two techniques are compared.

5. A method as claimed in claim 1, in which sum of the lengths of lines from a computed position to apexes of the areas enclosed by the lines of position determined by said two techniques. are compared.

6. A method as claimed in claim 1, including the step of producing the lines of position in cartesian co-ordinates.

7. A method according to claim 1, wherein said objects are road vehicles and said method is performed to identify the position of said road vehicles.

8. A method of determining a position of an object comprising the steps of
   (a) producing a plurality of hyperbolic electromagnetic wave patterns, wherein a position is identified by a intersection of two hyperbolic lines of position and each of said lines of position is defined by a lane and a fractional position within a lane;
   (b) identifying one or more enclosed area(s) defined by a third hyperbolic line of position which intersects at least one of the said two hyperbolic lines of position;
   (c) calculating size of a first identified enclosed area by identifying lanes in accordance with a first technique;
   (d) calculating size of a second identified enclosed area by identifying lanes in accordance with an independent second technique;
   (e) selecting among the lines of position within lanes by selecting lines which result in a smaller enclosed area; and
   (f) using the selected lines as a basis for determining the position of the object.

9. Apparatus for determining a position of an object, such as a road vehicles, comprising;
   means for producing a plurality of hyperbolic electromagnetic wave patterns;
   means for identifying an intersection of two hyperbolic lines of position, wherein each of said lines of position is defined by a lane and a fractional position within a lane;
   means for identifying one or more enclosed areas defined by a third hyperbolic line of position which intersects at least one of the said two hyperbolic lines of position and which is defined by a lane and fractional position within a lane;
   means for calculating a size of a first identified enclosed area by identifying lanes in accordance with a first technique;
   means for calculating a size of a second identified enclosed area by identifying lanes in accordance with an independent second technique; and
   means for selecting among the lines of position within lanes by selecting lines which result in a smaller enclosed area, and using said selected lines as a basis for determining the position of the object.

* * * * *